United States Patent
Petter et al.

(10) Patent No.: US 7,135,525 B2
(45) Date of Patent: *Nov. 14, 2006

(54) LASER-SINTERING POWDER WITH PMMI, PMMA, AND/OR PMMI-PMMA COPOLYMERS, PROCESS FOR ITS PREPARATION, AND MOLDINGS PRODUCED FROM THIS LASER-SINTERING POWDER

(75) Inventors: Christoph Petter, Glinde (DE); Maik Grebe, Bochum (DE); Sylvia Monsheimer, Haltern am See (DE); Franz-Erich Baumann, Duelmen (DE)

(73) Assignee: Degussa AG, Duesseldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/799,875

(22) Filed: Mar. 15, 2004

(65) Prior Publication Data

US 2004/0180980 A1    Sep. 16, 2004

(30) Foreign Application Priority Data

Mar. 15, 2003   (DE) ................ 103 11 437

(51) Int. Cl.
  *C08L 77/00*  (2006.01)
  *C08L 33/00*  (2006.01)
  *C08L 35/00*  (2006.01)
  *B29C 35/08*  (2006.01)

(52) U.S. Cl. ................ 525/183; 525/181; 522/2; 522/111; 522/112; 522/150; 522/153; 522/152; 264/497; 264/400; 264/463; 264/460; 264/482; 252/353.6; 252/182.19; 252/182.26; 252/182.27; 252/182.28; 428/402

(58) Field of Classification Search ............ 522/2, 522/109, 110, 111, 112, 150, 153, 152; 264/482, 264/460, 463, 400, 497; 252/363.5, 182.19, 252/182.26, 182.27, 182.28; 428/402; 525/183, 525/181

See application file for complete search history.

(56) References Cited

U.S. PATENT DOCUMENTS

| | | | |
|---|---|---|---|
| 4,415,706 A * | 11/1983 | Staas .................... 525/183 |
| 4,687,838 A | 8/1987 | Mumcu et al. |
| 5,405,936 A | 4/1995 | Mumcu et al. |
| 5,668,242 A | 9/1997 | Simon et al. |
| 5,932,687 A | 8/1999 | Baumann et al. |
| 6,060,550 A | 5/2000 | Simon et al. |
| 6,123,987 A * | 9/2000 | Lescaut .................... 427/195 |
| 6,136,948 A * | 10/2000 | Dickens et al. ............ 528/323 |
| 6,149,836 A | 11/2000 | Mumcu et al. |
| 6,300,413 B1 | 10/2001 | Simon et al. |
| 6,316,537 B1 | 11/2001 | Baumann et al. |
| 6,335,101 B1 | 1/2002 | Haeger et al. |
| 6,579,581 B1 | 6/2003 | Bartz et al. |
| 6,589,606 B1 | 7/2003 | Waterkamp et al. |
| 6,656,997 B1 | 12/2003 | Baumann et al. |
| 6,677,015 B1 | 1/2004 | Himmelmann et al. |
| 6,766,091 B1 | 7/2004 | Beuth et al. |
| 6,784,227 B1 | 8/2004 | Simon et al. |
| 6,884,485 B1 | 4/2005 | Baumann et al. |
| 2003/0114636 A1 | 6/2003 | Schiffer et al. |
| 2003/0124281 A1 | 7/2003 | Ries et al. |
| 2004/0086735 A1 | 5/2004 | Monsheimer et al. |
| 2004/0097636 A1 | 5/2004 | Baumann et al. |
| 2004/0102539 A1 | 5/2004 | Monsheimer et al. |
| 2004/0106691 A1 | 6/2004 | Monsheimer et al. |
| 2004/0137228 A1 * | 7/2004 | Monsheimer et al. ....... 428/402 |
| 2004/0138363 A1 | 7/2004 | Baumann et al. |
| 2004/0140668 A1 | 7/2004 | Monsheimer et al. |
| 2004/0180980 A1 | 9/2004 | Petter et al. |
| 2004/0204531 A1 | 10/2004 | Baumann et al. |
| 2004/0206443 A1 | 10/2004 | Monsheimer et al. |
| 2005/0014842 A1 | 1/2005 | Baumann et al. |
| 2005/0027047 A1 | 2/2005 | Monsheimer et al. |
| 2005/0027050 A1 | 2/2005 | Monsheimer et al. |
| 2005/0038201 A1 | 2/2005 | Wursche et al. |

FOREIGN PATENT DOCUMENTS

| | | |
|---|---|---|
| DE | 44 21 454 | 12/1995 |
| EP | 0 109 145 | 5/1984 |
| EP | 0 293 292 | 11/1988 |
| EP | 0 618 390 | 10/1994 |
| EP | 0 649 739 | 4/1995 |

OTHER PUBLICATIONS

U.S. Appl. No. 10/799,874, filed Mar. 15, 2004, Grebe et al.
U.S. Appl. No. 10/799,875, filed Mar. 15, 2004, Petter et al.

(Continued)

*Primary Examiner*—Sanza L. McClendon
(74) *Attorney, Agent, or Firm*—Oblon, Spivak, McClelland, Maier & Neustadt, P.C.

(57) ABSTRACT

The present invention relates to a sinter powder composed of polyamide which also comprises PMMI, PMMA, or copolymers with PMMI, in particular PMMI-PMMA copolymers, to the use of this sinter powder for laser-sintering, and also to moldings produced from this sinter powder. The moldings made from the powder of the invention have marked advantages over conventional products in their appearance and in their surface quality, especially as far as roughness and dimensional stability during selective laser sintering (SLS) are concerned. In addition, moldings produced from the sinter powder of the invention also have better mechanical properties than moldings based on conventional nylon-12 powders, in particular in terms of modulus of elasticity and tensile strength. These moldings also have a density close to that of injection moldings.

17 Claims, No Drawings

OTHER PUBLICATIONS

E. Schmachtenberg, et al., vol. 87, No. 6, XP-000656866, pp. 773, 774 and 776, "Lasersintern von Polyamid. Laser-Sintering of Polyamide", Jun. 1, 1997.
Derwent Search Report for DE 3510691.
U.S. Appl. No. 11/293,360, filed Dec. 5, 2005, Monsheimer et al.
U.S. Appl. No. 11/241,667, filed Oct. 3, 2005, Monsheimer et al.
U.S. Appl. No. 11/356,416, filed Feb. 17, 2006, Monsheimer et al.
U.S. Appl. No. 11/335,587, filed Jan. 20, 2006, Monsheimer et al.
U.S. Appl. No. 10/565,779, filed Jan. 25, 2006, Monsheimer et al.
U.S. Appl. No. 11/354,114, filed Feb. 15, 2006, Dowe et al.
U.S. Appl. No. 11/484,593, filed Jul. 12, 2006, Monsheimer et al.
U.S. Appl. No. 11/480,459, filed Jul. 5, 2006, Dowe et al.

* cited by examiner

LASER-SINTERING POWDER WITH PMMI, PMMA, AND/OR PMMI-PMMA COPOLYMERS, PROCESS FOR ITS PREPARATION, AND MOLDINGS PRODUCED FROM THIS LASER-SINTERING POWDER

BACKGROUND OF THE INVENTION

1. Field of the Invention

The invention relates to a laser-sintering powder based on polyamide, preferably nylon-12, which comprises PMMI (particles), or PMMA (particles), or PMMI-PMMA copolymer (particles), to a process for preparing this powder, and also to moldings produced by the selective laser-sintering of this powder.

2. Discussion of the Background

In very recent times, a task which is often encountered is the rapid production of prototypes. Selective laser-sintering is a process particularly well suited to rapid prototyping. In this process, polymer powders in a chamber are selectively irradiated briefly with a laser beam, resulting in melting of the particles of powder on which the laser beam falls. The molten particles fuse and solidify again to give a solid mass. Three-dimensional bodies can be produced simply and rapidly by this process, by repeatedly applying fresh layers and irradiating these.

The process of laser-sintering (rapid prototyping) to realize moldings made from pulverulent polymers is described in detail in the patent specifications U.S. Pat. No. 6,136,948 and WO 96/06881 (both DTM Corporation). A wide variety of polymers and copolymers can be used for this application, e.g. polyacetate, polypropylene, polyethylene, ionomers, and polyamide.

Nylon-12 powder (PA 12) has proven particularly successful in industry for laser-sintering to produce moldings, in particular to produce engineering components. The parts manufactured from PA 12 powder meet the high requirements demanded in respect of mechanical loading, and therefore have properties particularly close of those of the mass-production parts subsequently produced by extrusion or injection molding.

A PA 12 powder with a good suitability here has a median particle size ($d_{50}$) of from 50 to 150 μm, and is obtained as in DE 197 08 946 or else DE 44 21 454, for example. It is preferable here to use a nylon-12 powder with a melting point of from 185 to 189° C., an enthalpy of fusion of 112±17 J/g, and a freezing point of from 138 to 143° C., as described in EP0911 142.

Although the properties of the known polymer powders are indeed good, moldings produced using these powders still have some disadvantages. Particular disadvantages with the polyamide powders currently used are rough surfaces on the moldings, these resulting from the boundary between particles which have undergone melting or incipient melting and the surrounding particles which have not undergone melting. In addition, the formation of extended crystallite structures on cooling of the moldings from polyamide sinter powder is disadvantageous insofar as it is found to give increased shrinkage, or even warpage of the parts. Relatively large components, or components where there is some hindrance to shrinkage, are particularly susceptible to warpage. The very rough surfaces require a coating if parts of suitable quality are to be obtained. In addition, the roughness of the surface causes small structures to merge, making their resolution unsatisfactory.

It was therefore an object of the present invention to provide a laser-sintering powder which can give better dimensional stability and surface quality in the parts produced by means of selective laser-sintering.

Surprisingly, it has now been found that addition of poly(N-methylmethacrylimide) (PMMI), polymethyl methacrylate (PMMA), and/or PMMI-PMMA copolymer to polyamides can produce sinter powders from which, by laser-sintering, it is possible to produce moldings which have markedly better dimensional stability and smoothness than moldings made from conventional sinter powders.

SUMMARY OF THE INVENTION

Accordingly, it is an object of the present invention to provide a sinter powder for selective laser sintering, which comprises at least one polyamide and at least one PMMI, at least one PMMA, and/or at least one PMMI-PMMA copolymer.

It is another object of the present invention to provide a process of preparing sinter powder of the invention, which comprises mixing at least one polyamide with PMMI, PMMA, and/or PMMI-PMMA copolymer, to give a sinter powder.

Additionally, it is another object of the present invention to produce moldings that are produced by laser sintering sinter powders, which comprise PMMI, PMMA, or PMMI-PMMA copolymer, and at least one polyamide.

The sinter powder of the invention has the surprising advantage that moldings produced therefrom by laser sintering have a very smooth surface. Even small structures, such as inscriptions, have very good resolution. This opens up application sectors which hitherto were inaccessible due to poor resolution.

The very good dimensional stability of the components enormously improves the reliability of the process, because it is possible to reproduce the desired dimensions directly in the first step. This is often not the case when conventional powders are used, the result being warpage of components when they are first manufactured, and the need to repeat the sintering process using different process parameters or different placing within the manufacturing chamber.

Surprisingly, it has been found that moldings produced from the sinter powder of the invention have equally good or even better mechanical properties in particular in terms of modulus of elasticity, tensile strength, and density.

The sinter powder of the invention, and also a process for its preparation, are described below, but there is no intention of any resultant restriction of the invention.

DETAILED DESCRIPTION OF THE INVENTION

A feature of the sinter powder of the invention for selective laser-sintering is that the powder comprises at least one polyamide and at least one PMMI, PMMA, PMMI-PMMA copolymer, preferably a PMMI-PMMA copolymer. The polyamide present in the sinter powder of the invention preferably comprises a polyamide which has at least 8 carbon atoms per carboxamide group. The sinter powder of the invention preferably comprises at least one polyamide which has 10 or more carbon atoms per carboxamide group. The sinter powder very particularly preferably comprises at least one polyamide selected from nylon-6,12 (PA 612), nylon-11 (PA 11), and nylon-12 (PA 12), or copolyamides based on the abovementioned polyamides. The sinter powder of the invention preferably comprises an unregulated polyamide.

A nylon-12 sinter powder particularly suitable for laser-sintering is known whose melting point is from 185 to 189° C., preferably from 186 to 188° C., and whose enthalpy of fusion is 112±17 J/g, preferably from 100 to 125 J/g, and whose freezing point is from 133 to 148° C., preferably from 139 to 143° C. The process for preparing the polyamide powders on which the sinter powders of the invention are based is well-known and in the case of PA 12 may by way of example be found in the specifications DE 29 06 647, DE 35 10 687, DE 35 10 691 and DE 44 21 454, the content of which is incorporated into the disclosure content of the present invention by way of reference. The necessary polyamide pellets may be purchased from various producers, and by way of example nylon-12 pellets are supplied by Degussa AG with the trade name Vestamid®.

Another nylon-12 particularly suitable is one which has a melting point from 185 to 189° C., preferably from 186 to 188° C., and whose enthalpy of fusion is 120±17 J/g, preferably from 110 to 130 J/g, and whose freezing point is from 130 to 140° C., preferably from 135 to 138° C., and whose crystallization temperature after aging is preferably from 135 to 140° C. These properties were determined as described in EP 0 911 142, by means of DSC. The method of aging was storage at 150° C. for 7 days in a VT 5142 EK vacuum drying cabinet from Heraeus. Nylon-12 powders which have these properties are described by way of example in DE 102 55 793, and preferably comprise metal soaps.

Based on the entirety of the polymers present in the powder, the sinter powder of the invention preferably comprises from 0.01 to 30% by weight of at least PMMI, PMMA, and/or PMMI-PMMA copolymer, with preference from 0.1 to 20% by weight of PMMI, PMMA, and/or PMMI-PMMA copolymer, with particular preference from 0.5 to 15% by weight of PMMI, PMMA, and/or PMMI-PMMA copolymer, and with very particular preference from 1 to 12% by weight of PMMI, PMMA, and/or PMMI-PMMA copolymer. The ranges stated here are based on the total content of PMMI, PMMA, and PMMI-PMMA copolymer in the powder, where powder means the entire amount of components. The sinter powder of the invention may comprise a mixture of particles of PMMI, particles of PMMA, and/or particles of PMMI-PMMA copolymer with particles of polyamide, or else comprise polyamide particles or, respectively, powder into which PMMI, PMMA, and/or PMMI-PMMA copolymer has been incorporated. If the content of PMMI, PMMA, and/or PMMI-PMMA copolymer, based on the entirety of the polymers present in the powder, is below 0.01% by weight, there is a marked reduction in the desired effect providing dimensional stability and surface quality. If the content of PMMI, PMMA, and/or PMMI-PMMA copolymer, based on the entirety of the polymers present in the powder, is above 30% by weight, the mechanical properties become markedly poorer, e.g. the tensile strain at break of moldings produced from these powders.

If the sinter powder comprises a mixture of polyamide particles and particles of PMMI, particles of PMMA, and/or particles of PMMI-PMMA copolymer, the preferred median particle size of polyamide particles is from 10 to 250 µm, preferably from 40 to 100 µm, and particularly preferably from 45 to 80 µm. The size of the particles of PMMI, particles of PMMA, and/or particles of PMMI-PMMA copolymer is preferably within 20%, with preference within 15%, and very particularly preferably within 5%, of the median grain size $d_{50}$ of the polyamide particles or, respectively, polyamide powders. The grain size is in particular subject to a limit by virtue of the permissible overall height or, respectively, layer thickness in the laser-sintering apparatus.

If the sinter powder comprises particles which comprise not only polyamide but also at least one PMMI, PMMA, and/or PMMI-PMMA copolymer, the median grain size $d_{50}$ of the particles is preferably from 10 to 250 µm, with preference from 40 to 100 µm, and particularly preferably from 45 to 80 µm.

The poly(N-methylmethacrylimides) (PMMI), polymethyl methacrylates (PMMA), and/or PMMI-PMMA copolymers present in the sinter powder of the invention are preferably copolymers of PMMI and PMMA which are prepared by partial cycloimidization of the PMMA. (The usual method of preparing PMMI via partial imidization of PMMA is to imidize no more than 83% of the PMMA used. The resultant product is termed PMMI, but is strictly a PMMI-PMMA copolymer). Both PMMA and PMMI or PMMI-PMMA copolymers are commercially available, e.g. with the trademarks Pleximid® or Plexiglas® from Röhm. One example of a copolymer (PLEXIMID 8803) has 33% of MMI units, 54.4% of MMA units and 2.6% of methacrylic acid units, and 1.2% of anhydride units.

The poly(N-methylmethacrylimides) used may in particular be those which have at least the following constituents:

i) from 14 to 85 parts by weight, preferably from 30 to 70 parts by weight

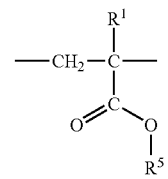

ii) from 10 to 75 parts by weight, preferably from 20 to 40 parts by weight

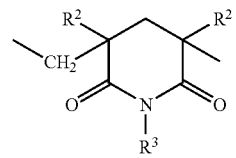

iii) from 0 to 15 parts by weight

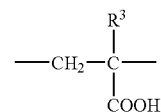

iv) from 1 to 20 parts by weight, preferably from 2 to 12 parts by weight

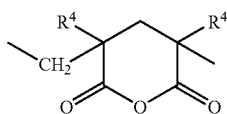

In the formulae mentioned $R^1$ to $R^5$ are identical or different aliphatic or alicyclic radicals having from 1 to 40 carbon atoms, preferably —$CH_3$.

The copolymers are termed polymethacrylimides, and sometimes also polyglutarimides. These are polymethyl (meth)acrylates in which two adjacent carboxyl(ate) groups have been reacted to give a cyclic imide. The preferred method of imide formation uses ammonia or primary amines, e.g. methylamine. The products are known, as is their preparation (Hans R. Kricheldorf, Handbook of Polymer Synthesis, Part A, Verlag Marcel Dekker Inc. New York—Basle—Hong Kong, pp. 223 et seq.; H. G. Elias, Makromoleküle, Hüthig und Wepf Verlag Basle—Heidelberg—New York; U.S. Pat. Nos. 2,146,209 and 4,246,374).

Sinter powders of the invention may comprise flow aids or else other auxiliaries and/or fillers, and/or pigments. These auxiliaries may be fumed silica or else precipitated silicas, for example. Fumed silica is supplied by way of example with the product name Aerosil®, with various specifications, by Degussa AG. Sinter powder of the invention comprises less than 3% by weight, preferably from 0.001 to 2% by weight, and very particularly preferably from 0.05 to 1% by weight of these fillers, based on the entirety of the polymers present, i.e. the entirety of polyamides, PMMA, PMMI, and/or PMMI-PMMA copolymers. Examples of the fillers are glass particles, aluminum particles, metal particles, or ceramic particles, e.g. solid or hollow glass beads, steel shot, or granulated metal, or else color pigments, e.g. transition metal oxides.

The grain size of the filler particles here is preferably smaller than or approximately equal to the grain size of the particles of the polyamides. The median grain size $d_{50}$ of the fillers should preferably not exceed the median grain size $d_{50}$ of the polyamides by more than 20%, with preference 15%, and with very particular preference 5%. A particular limitation on the particle size results from the permissible overall height or, respectively, layer thickness in the laser-sintering apparatus.

Sinter powder of the invention preferably comprises less than 70% by weight, with preference from 0.001 to 60% by weight, with particular preference from 0.05 to 50% by weight, and with very particular preference from 0.5 to 25% by weight, of these fillers, based on the entirety of the polymers present, the proportion of the polymers by volume therefore always being greater than 50%.

If the stated maximum limits for auxiliaries and/or fillers are exceeded, depending on the filler or auxiliary used, the result can be marked impairment of mechanical properties of moldings produced from these sinter powders. The excess can moreover disrupt the intrinsic absorption of laser light by the sinter powder, making this powder unusable for selective laser-sintering.

The sinter powders of the invention can be prepared simply, and preferably by the process of the invention for preparing sinter powder of the invention by mixing at least one polyamide with at least one PMMI or PMMA or PMMI-PMMA copolymer. Dry mixing or mixing in suspension may be used. In a preferred method, a polyamide powder obtained, for example, by reprecipitation and/or milling, which may also then be fractionated, is mixed with PMMI, PMMA and/or PMMI-PMMA copolymer powder. The polyamide may moreover be compounded with PMMI, PMMA, and/or PMMI-PMMA copolymer to give a sinter powder and then be milled. Another possible embodiment suspends the polyamide in the presence of a solvent in which the PMMI or PMMA or PMMI-PMMA copolymer has at least some degree of solubility, and mixes it with PMMI, PMMA, and/or PMMI-PMMA copolymer, and then removes the dispersion medium/solvent.

In the simplest embodiment of the process of the invention, a fine-particle mixture may be obtained, for example, by using a mixing process to apply a fine powder of PMMI, of PMMA, or of PMMI-PMMA copolymer to the dry polyamide powder in high-speed mechanical mixers, or by a wet-mixing process in low-speed assemblies—e.g. paddle dryers or circulating screw mixers (known as Nauta mixers)—or by dispersion of PMMI, PMMA, and/or PMMI-PMMA copolymer and polyamide (powder) in an organic solvent followed by distillative removal of the solvent. Examples of solvents suitable for this variant are lower alcohols having from 1 to 3 carbon atoms, and ethanol may preferably be used as solvent.

In one of these first variants of the process of the invention, the polyamide powder may be a polyamide powder which is in itself a suitable laser-sintering powder, and with which fine particles of PMMI, of PMMA, or of PMMI-PMMA copolymer are simply admixed. The particles preferably have approximately the same median grain size as the particles of the polyamides. The median grain size of the particles of PMMI, particles of PMMA, and/or particles of PMMI-PMMA copolymer is preferably within 20%, with preference within 15%, and very particularly preferably within 5%, of the median grain size $d_{50}$ of the polyamide particles or, respectively, polyamide powders. The grain size is in particular subject to a limit by virtue of the permissible overall height or, respectively, layer thickness in the laser-sintering apparatus.

It is also possible to mix conventional sinter powders with sinter powders of the invention. This method can give sinter powders with an ideal combination of mechanical and optical properties. The process for preparing these mixtures can be found by way of example in DE 34 41 708.

In another variant of the process, PMMI, PMMA, and/or PMMI-PMMA copolymer is mixed with a, preferably molten, polyamide, using incorporation by compounding, and the resultant PMMI-, PMMA-, and/or PMMI-PMMA-copolymer-containing polyamide is processed by (low-temperature) milling and, where appropriate, fractionation, to give laser-sintering powder. The compounding process usually gives pellets which are then processed to give sinter powder, generally by low-temperature milling. That variant of the process in which PMMI, PMMA, and/or PMMI-PMMA copolymer is incorporated by compounding has the advantage over the straight mixing process of achieving more homogeneous distribution of the PMMI and/or PMMA, and/or PMMI-PMMA copolymer in the sinter powder.

Where appropriate, to improve the flow behavior of the powder of the invention, a suitable flow aid, such as fumed aluminum oxide, fumed silica, or fumed titanium dioxide, may be added externally to the precipitated or low-temperature milled powder.

In another variant of the process, PMMI, PMMA, and/or PMMI-PMMA copolymer in the form of powder is admixed with the polyamide before the precipitation process is complete, preferably within the freshly precipitated suspension. This type of precipitation process is described by way of example in DE 35 10 687 and DE 29 06 647.

The person skilled in the art can also apply this variant of the process in a modified form to other polyamides, by selecting polyamide and solvent in such a way that the polyamide dissolves in the solvent at an elevated temperature and precipitates from the solution at a lower temperature and/or on removal of the solvent. The corresponding polyamide laser-sintering powders of the invention are obtained by adding PMMI, PMMA, and/or PMMI-PMMA copolymer, preferably in the form of particles, to this solution, and subsequent drying.

The PMMI, PMMA and/or PMMI-PMMA copolymers used may be commercially available products, for example those which can be purchased from Röhm with the trademark Pleximid® or Plexiglas®, or may be those described above.

Materials which may be added to the sinter powder to improve processability or for its further modification are inorganic pigments, in particular color pigments, e.g. transition metal oxides, stabilizers, e.g. phenols, in particular sterically hindered phenols, flow aids, e.g. fumed silicas, and also particulate fillers. The amount of these substances added to the polyamide, based on the total weight of polyamides in the sinter powder, is preferably such as to comply with the concentrations stated for fillers and/or auxiliaries for the sinter powder of the invention.

The present invention also provides a process for producing moldings by selective laser-sintering, using sinter powders of the invention comprising polyamide and PMMA or PMMI, i.e. partially imidated PMMA, or copolymers thereof, particularly in particulate form. The present invention in particular provides a process for producing moldings by selective laser-sintering of a PMMI-, PMMA-, or PMMI-PMMA-copolymer-containing precipitation powder based on a nylon-12 which has a melting point of from 185 to 189° C., an enthalpy of fusion of 112±17 J/g, and a freezing point of from 136 to 145° C., the use of which is described in U.S. Pat. No. 6,245,281.

Laser-sintering processes are well-known, and are based on the selective sintering of polymer particles, layers of polymer particles being briefly exposed to laser light, thus causing the polymer particles which have been exposed to the laser light to become bonded to one another. Successive sintering of layers of polymer particles produces three-dimensional objects. Details of the selective laser-sintering process are found by way of example in the specifications U.S. Pat. No. 6,136,948 and WO 96/06881.

The moldings of the invention produced by selective laser-sintering comprise at least PMMI, PMMA, and/or PMMI-PMMA copolymer, and at least one polyamide. The moldings of the invention preferably comprise at least one polyamide which has at least 8 carbon atoms per carboxamide group. Moldings of the invention very particularly preferably comprise at least one nylon-6,12, nylon-11, and/or nylon-12, and PMMI, PMMA, and/or PMMI-PMMA copolymers.

The PMMI present in the molding of the invention is based on PMMA which has been partially cycloimidized, or PMMA, or copolymer of PMMI and PMMA. The molding of the invention preferably comprises, based on the entirety of the polymers present in the molding, from 0.01 to 30% by weight of PMMI, PMMA, and/or PMMI-PMMA copolymer, with preference from 0.1 to 20% by weight, and with particular preference from 0.5 to 15% by weight, and with very particular preference from 1 to 12% by weight. The proportion of PMMI, PMMA, and PMMI-PMMA copolymer is not more than 30% by weight, based on the entirety of the polymers present in the molding.

The moldings may moreover comprise fillers and/or auxiliaries, and/or pigments, e.g. heat stabilizers, and/or antioxidants, e.g., sterically hindered phenol derivatives. Examples of fillers are glass particles, ceramic particles, and also metal particles, e.g., iron spheres, and/or corresponding hollow spheres. The moldings of the invention preferably comprise glass particles, very particularly preferably glass beads. Moldings of the invention preferably comprise less than 3% by weight, with preference from 0.001 to 2% by weight, and very particularly preferably from 0.05 to 1% by weight, of these auxiliaries, based on the entirety of the polymers present. Moldings of the invention also preferably comprise less than 75% by weight, with preference from 0.001 to 70% by weight, with particular preference from 0.05 to 50% by weight, and with very particular preference from 0.5 to 25% by weight, of these fillers, based on the entirety of the polymers present.

The examples below are intended to describe the sinter powder of the invention and its use, but no restriction of the invention to the examples is intended.

EXAMPLES

The BET surface area determination that was performed, as described in the examples below, complied with DIN 66131. Bulk density was determined using an apparatus to DIN 53466. Laser scattering was measured on a Malvern Mastersizer S, using version 2.18. Beam compensation was determined using an internal specification, and it was used as a measure of precision of reproduction. The smaller the beam compensation, the greater the accuracy of reproduction of a structure using the laser beam. When this method was used, a laser-sintering machine constructed specimens of varying lengths, which were 10 mm wide and 3 mm thick. The lengths were 5, 8, 10, 20, 50, and 100 mm. To make handling easier, there is a narrow fillet connecting these specimens to one another. The components were placed in the four corners of the manufacturing chamber. The individual sets were in each case rotated by 90 degrees with respect to the others. A slide gauge was used to measure the length of the specimens, in each case at the sides and centrally, the measured values for the 4 components were averaged, and then the required values and actual values were plotted graphically against one another. A straight line was drawn through these points, and the value for beam compensation (in mm) was obtained, this being the point of intersection representing the shift of the straight line from the origin (constant in the equation for the straight line).

Example 1

Preparation of Laser-Sintering Powder With no PMMI 40 kg of unregulated PA 12, which was prepared by hydrolytic polymerization by a method based on DE 35 10 691, Example 1, with a relative solution viscosity $\eta_{rel}$ of 1.61 (in acidified m-cresol) and with an end group content of 72 mmol/kg of COOH and 68 mmol/kg of $NH_2$, were heated to 145° C. with 0.3 kg of Irganox® 1098 in 350 L of ethanol denaturated with 2-butanone and 1% water content within a period of 5 hours in a 0.8 m³ stirred vessel (diameter=90 cm, height=170 cm), and held for 1 hour at this temperature with stirring (blade stirrer: blade diameter=42 cm, blade rotation=91 rpm). The jacket temperature was then reduced to 120° C., and the internal temperature was brought to 120° C., using a cooling rate of 45 K/h, with the same stirrer rotation rate. While using the same cooling rate, the jacket temperature was maintained at a level of from 2 to 3 K below the internal temperature. The internal temperature was brought to 117° C., using the same cooling rate, and then held constant for 60 minutes. The internal temperature was then brought to 111° C., using a cooling rate of 40 K/h. At this temperature precipitation began, which was detectable by heat generation. After 25 minutes the internal temperature fell, which indicated that the precipitation had ended. After the suspension was cooled at 75° C., the suspension was transferred to a paddle dryer. The ethanol was distilled off from the mixture with stirring at 70° C./400 mbar and the residue was then further dried for 3 hours at 20 mbar/85° C.

TABLE 1

Sieve analysis of laser-sintering powder with no PMMI

| Particle Size, μm | % by wt. |
|---|---|
| <32 | 7 |
| <40 | 16 |
| <50 | 44 |
| <63 | 85 |
| <80 | 92 |
| <100 | 100 |

BET: 6.9 m²/g

Density: 429 g/L

Laser scattering: d(10%): 42 μm, d(50%): 69 μm, d(90%): 91 μm

Example 2

Preparation of Laser-Sintering Powder by Incorporation of PMMI (PLEXIMID 8813) by Compounding Followed by Milling 40 kg of regulated VESTAMID L1600 PA 12 from Degussa AG, prepared by hydrolytic polymerization, were extruded with 0.3 kg of Irganox® 245 and 0.8 kg of PMMI (PLEXIMID 8813, Röhm GmbH) at 225° C. in a twin-screw compounder (Berstorf ZE25), and strand-pelletized. The pellets were then milled at low temperatures (−40° C.) in an impact mill to give a grain size distribution from 0 to 120 μm. 40 g of Aerosil 200 (0.1 part) were then mixed into the material for 3 minutes at 500 rpm and room temperature.

Example 3

Preparation of Laser-Sintering Powder by Incorporation of PMMI (PLEXIMID 8813) PMMI in a Dry Blend The dry blend process, which utilized a FML10/KM23 Henschel mixer for 3 minutes at 50° C. and 700 rpm, was used to mix 100 g (5 parts) of PLEXIMID 8813 with 1900 g (95 parts) of nylon-12 powder prepared in accordance with DE 29 06 647, Example 1, with a median grain diameter $d_{50}$ of 56 μm (laser scattering) and with a bulk density of 459 g/L to DIN 53466. 2 g of Aerosil 200 (0.1 part) were then mixed into the material within 3 minutes at room temperature.

The same conditions were used to prepare other powders having 0, 1, 3, 4, and 10% of PLEXIMID 8813.

Further processing:

The powders from Example 3 were used on a laser-sintering machine to construct the test specimens described above for determining beam compensation, and to construct a multipurpose specimen to ISO 3167. A tensile test to EN ISO 527 was used to determine mechanical values on the latter components. Each production took place on an EOSINT P360 laser-sintering machine from EOS GmbH.

TABLE 2

Properties of laser-sintering powder with added PLEXIMID 8813.

| PMMI | Beam compensation | Modulus of elasticity N/mm² | Tensile strain at break % | Tensile specimen thickness, mm | Tensile specimen width, mm | Tensile strength, N/mm² |
|---|---|---|---|---|---|---|
| 0% | 0.82 | 1633 | 20.7 | 4.38 | 10.61 | 46.6 |
| 1% | 0.79 | 1646 | 19.1 | 4.34 | 10.60 | 46.1 |
| 3% | 0.77 | 1790 | 16.9 | 4.21 | 10.63 | 49.2 |
| 4% | 0.77 | 1812 | 14.6 | 4.05 | 10.59 | 49.4 |
| 10% | 0.73 | 1839 | 7.9 | 4.07 | 10.51 | 47.7 |

It is clearly seen that increased addition of PMMI to the laser-sintering powder permits production of moldings with markedly lower beam compensation. Increased addition of PMMI moreover increases modulus of elasticity, while at the same time reducing tensile strain at break. Furthermore, as the content of the PMMI increases, the dimensions of the moldings approximate ever more closely to the required value, which is 4 mm for tensile specimen thickness and 10 mm for tensile specimen width.

The priority document of the present application, DE application 103 11 437.8, filed Mar. 15, 2003, is incorporated herein by reference.

Obviously, numerous modifications and variations on the present invention are possible in light of the above teachings. It is therefore to be understood that within the scope of the appended claims, the invention may be practiced otherwise than as specifically described herein.

What is claimed as new and is intended to be secured by a Letters Patent is:

1. A sinter powder comprising:
   at least one polyamide in the form of a particle; and
   at least one poly(N-methylmethacrylimide) (PMMI), in the form of a particle;
   wherein the the median grain size $d_{50}$ of the particles of PMMI is within 20% of the median grain size $d_{50}$ of the polyamide particles, wherein the PMMI has at least the following constituents:
   i) from 14 to 85 parts by weight of:

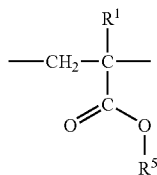

ii) from 10 to 75 parts by weight of:

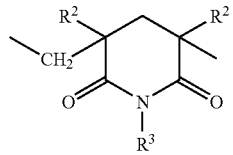

iii) from 0 to 15 parts by weight of:

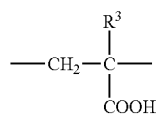

iv) from 1 to 20 parts by weight of:

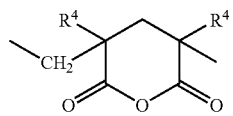

wherein $R^1$ to $R^5$ are identical or different aliphatic or alicyclic radicals having from 1 to 40 carbon atoms.

2. The sinter powder as claimed in claim 1, wherein the at least one polyamide comprises at least 8 carbon atoms per carboxamide group.

3. The sinter powder as claimed in claim 1, wherein the at least one polyamide comprises an unregulated polyamide.

4. The sinter powder as claimed in claim 1, wherein the at least one polyamide comprises at least one nylon which is selected from the group consisting of nylon-6,12, nylon-11, nylon-12, a copolyamide; wherein said copolyamide is based on said nylons, and mixtures thereof.

5. The sinter powder as claimed in claim 1, comprising from 0.01 to 30 wt. % of said at least one (PMMI), based on the entirety of the polymers present in the powder.

6. The sinter powder as claimed in claim 1, comprising from 0.5 to 15 wt. % of said at least one (PMMI), based on the entirety of the polymers present in the powder.

7. The sinter powder as claimed in claim 1, comprising a mixture of particles of said at least one (PMMI), with particles of polyamide.

8. The sinter powder as claimed in claim 1, comprising polyamide particles into which said at least one (PMMI) has been incorporated.

9. The sinter powder as claimed in claim 1, which further comprises at least one member selected from the group consisting of an auxiliary, a filler, a pigment and mixtures thereof.

10. The sinter powder as claimed in claim 9, wherein the auxiliary is present, and comprises a flow auxiliary.

11. The sinter powder as claimed in claim 9, wherein the filler is present, and comprises glass particles.

12. The sinter powder as claimed in claim 9, wherein the filler is present, and comprises aluminum particles.

13. A process for preparing the sinter powder as claimed in claim 1, comprising:
    mixing at least one polyamide with said at least one (PMMI).

14. The process as claimed in claim 13, comprising mixing a polyamide powder obtained by reprecipitation or milling, in suspension or in solution in an organic solvent, or in bulk, with said at least one (PMMI).

15. The process as claimed in claim 13, comprising compounding said at least one (PMMI) into a melt of polyamide, to obtain a mixture; and
    milling said mixture to give a laser sinter powder.

16. A process for producing moldings, which comprises:
    selectively laser sintering the sinter powder as claimed in claim 1.

17. The sinter powder as claimed in claim 1, wherein the constituents of the at least one PMMI are present in the following amounts:
    i) from 30 to 70 parts by weight of:

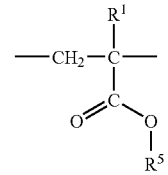

ii) from 20 to 40 parts by weight of:

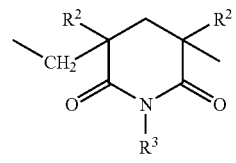

iii) from 0 to 15 parts by weight of:

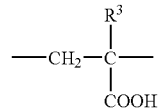

iv) from 2 to 12 parts by weight of:

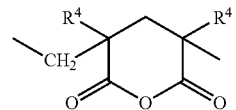

wherein $R^1$ $R^5$ are —$CH_3$.

* * * * *